(12) United States Patent
Nakamikawa

(10) Patent No.: US 7,012,786 B2
(45) Date of Patent: Mar. 14, 2006

(54) MAGNETIC HEAD

(75) Inventor: Juninchi Nakamikawa, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 115 days.

(21) Appl. No.: 10/460,375

(22) Filed: Jun. 13, 2003

(65) Prior Publication Data

US 2003/0231428 A1     Dec. 18, 2003

(30) Foreign Application Priority Data

Jun. 13, 2002   (JP)  .............................. 2002-172595

(51) Int. Cl.
*G11B 5/60*   (2006.01)

(52) U.S. Cl. .................................................. 360/234.7

(58) Field of Classification Search .. 360/234.7–234.8, 360/235.4, 235.6–235.8, 236.1–236.6, 236.9, 360/237, 317, 126

See application file for complete search history.

(56) References Cited

U.S. PATENT DOCUMENTS

| | | | | |
|---|---|---|---|---|
| 3,927,470 A | * | 12/1975 | Case | 29/603.16 |
| 4,729,048 A | * | 3/1988 | Imakoshi et al. | 360/234.7 |
| 4,924,334 A | * | 5/1990 | Diepers et al. | 360/77.07 |
| 5,452,165 A | * | 9/1995 | Chen et al. | 360/121 |
| 5,920,447 A | * | 7/1999 | Sakata et al. | 360/121 |
| 6,002,552 A | * | 12/1999 | Leung | 360/75 |
| 6,081,402 A | * | 6/2000 | Cho | 360/77.04 |
| 6,219,200 B1 | * | 4/2001 | Waki et al. | 360/126 |
| 6,553,648 B1 | * | 4/2003 | Kaeriyama et al. | 29/603.12 |
| 6,729,013 B1 | * | 5/2004 | Sasaki | 29/603.07 |

\* cited by examiner

*Primary Examiner*—Angel Castro
(74) *Attorney, Agent, or Firm*—Sughrue Mion, PLLC

(57) ABSTRACT

A magnetic head capable of increasing the data transfer rate during recording and/or reproduction, while improving the accuracy of tracking control is provided. The magnetic head for magnetically recording and/or reproducing data from magnetic disk media is constructed by: a head slider for approaching or contacting the magnetic disk media; rails or pads formed on the head slider; and head elements provided on the rails or the pads; wherein a plurality of head elements are provided on one of the rails or the pads at intervals along the track arrangement direction of the magnetic disk media.

4 Claims, 3 Drawing Sheets

MAGNETIC HEAD

BACKGROUND OF THE INVENTION

1. Field of the Invention

The present invention relates to a magnetic head for magnetically recording and/or reproducing data from magnetic disk media, such as a magnetic disk cartridge.

2. Description of the Related Art

Conventional magnetic disk cartridges are provided comprising: a flexible magnetic disk medium formed by a discoid substrate formed of a flexible polyester sheet or the like having magnetic layers formed on both sides thereof; and a case having a window for insertion of a magnetic head. The magnetic disk media is rotatably housed within the case. This type of magnetic disk cartridge is mainly used as recording media for computers, due to its advantages regarding ease of use and low cost.

A drive apparatus for driving a magnetic disk cartridge of the aforementioned construction generally comprises: a rotating drive means for rotating the magnetic disk medium; a magnetic head for performing recording and/or reproduction of signals from the magnetic disk medium; and a magnetic head arm on which the magnetic head is mounted, for moving the magnetic head in the radial direction of the magnetic disk medium. With regard to a drive apparatus of this structure, data is recorded onto and reproduced from concentric tracks of the magnetic disk medium by the relative movement between the magnetic head and the magnetic disk medium in the circumferential direction thereof, as well as movement of the magnetic head in the radial direction of the magnetic disk medium by the movement of the magnetic head arm.

Note that the aforementioned magnetic head basically comprises: a head slider that approaches or contacts the magnetic disk medium; rails or pads formed on the head slider; and head elements provided on the rails or pads.

Regarding the conventional magnetic head of the basic structure described above, a single or a plurality of rails or pads are formed on the head slider. A head element is formed on one of the rails or the pads. Note that there are provided magnetic heads having a head element formed on each of a pair of rails or pads. However, even magnetic heads of this construction, only one head element on one of the rails or pads is actually utilized for magnetic recording and/or reproduction. That is, these magnetic heads are constructed in this manner due to magnetic heads for facing both sides of a magnetic disk medium being produced in a common step.

Recently, there is a widespread demand for miniaturization of magnetic disk cartridges, so that they can be used as low cost removable media for portable equipment. A problem of reduced data transfer rate arises along with a decrease in the diameter of magnetic disk media. If the data transfer rate becomes slow, recording/reproduction of data in real time becomes impossible in a video camera that processes motion pictures, for example.

In addition, in the case that the diameter of magnetic disk media is decreased, the recording density is increased, in order not to decrease recording capacity thereof. That is, it is often the case that the tracks are made narrower. However, if the tracks are made narrower, tracking control, by which the magnetic head follows the tracks, becomes difficult. That is, as the tracks become narrower, servo signals which are used for tracking control become more likely to be influenced by signal dropouts and the like, thereby causing failures in the tracking control.

SUMMARY OF THE INVENTION

The present invention has been developed in view of the above circumstances, and it is an object of the present invention to provide a magnetic head that enables high speed data transfer, while improving the accuracy of tracking control.

The magnetic head according to the present invention is a magnetic head for magnetically recording and/or reproducing data from magnetic disk media comprising:

a head slider for approaching or contacting the magnetic disk media;

rails or pads formed on the head slider; and head elements provided on the rails or the pads; wherein a plurality of head elements are provided on one of the rails or the pads at intervals along the track arrangement direction of the magnetic disk media.

Note that regarding the structure described above, it is desirable that each of the head elements comprises a combined head element containing an inductive one and a MR (magneto resistive effect) one, formed by a thin film process.

The magnetic head according to the present invention comprises a plurality of head elements provided on one of the rails or the pads at intervals along the track arrangement direction of the magnetic disk media. Therefore, the plurality of head elements are employed to simultaneously record data to or reproduce data from multiple locations of the magnetic disk media, thereby increasing the data transfer rate during recording or reproduction.

In addition, servo signals can also be read from multiple locations of the magnetic disk media by employing the plurality of head elements as described above. Therefore, even if there is a missing servo signal at one location of the magnetic disk media due to signal drop out or the like, servo signals from other locations become usable, thereby improving the accuracy of tracking control.

DESCRIPTION OF THE PREFERRED EMBODIMENTS

Hereinafter, the embodiments of the present invention will be described in detail with reference to the attached drawings.

Figure 1:
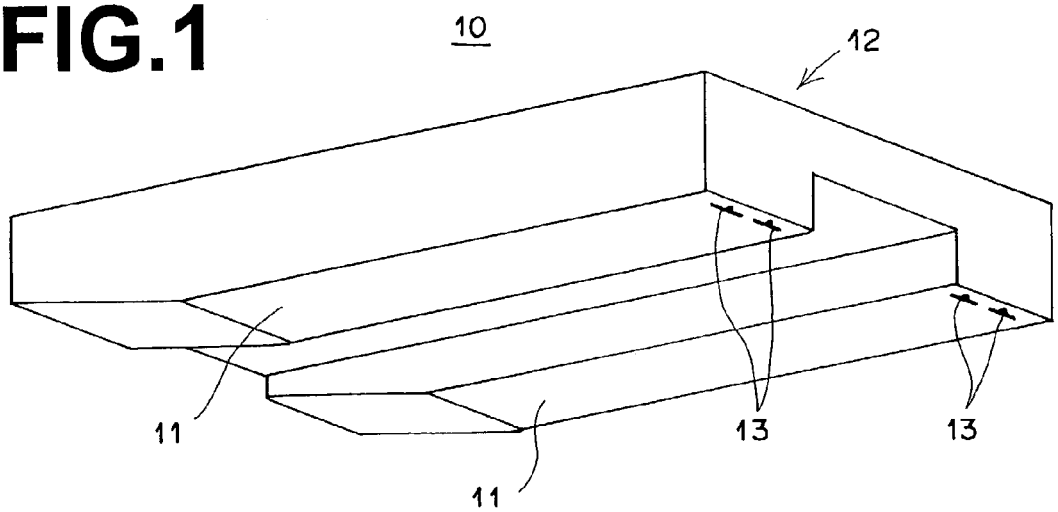
FIG. 1 is a perspective view showing a magnetic head according to a first embodiment of the present invention.

FIG. 1 is a perspective view of a magnetic head 10 according to a first embodiment of the present invention. The magnetic head 10 comprises a head slider 12; two rails 11, 11 provided on the head slider 12; and two head elements 13, 13 provided on each of the rails 11. Each of the rails 11 is tapered so that the thicknesses thereof decrease toward one of the ends thereof The head elements 13 are provided at the end of the rails 11 opposite the tapered ends thereof. A combined head element formed by a thin film process comprising an inductive element and an MR (Magneto Resistive effect) element is utilized as the head element 13.

Figure 2:
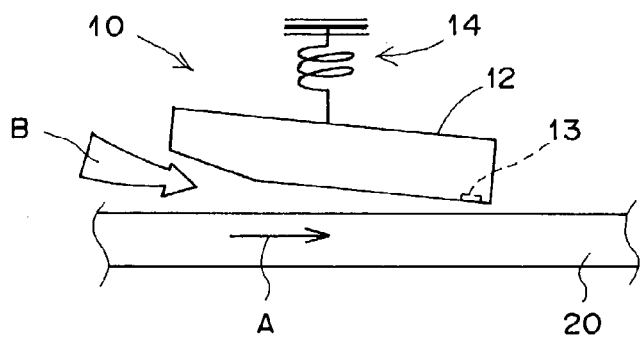
FIG. 2 is a side view showing the magnetic head of FIG. 1 in use.

This magnetic head 10, as shown schematically in FIG. 2, is utilized for magnetic recording/reproduction by being made to approach a rotating magnetic disk medium 20 while held by a gimbal. The magnetic disk medium 20 rotates in the direction indicated by arrow A. Note that the head slider 12 is held inclined so that the front edge thereof is further away from the magnetic disk medium 20 than the rear edge thereof. By this positioning, the air flow, indicated by arrow B, generated by rotation of the magnetic disk media 20, is caused to travel between the two rails 11, 11 toward the rear.

Figure 3:
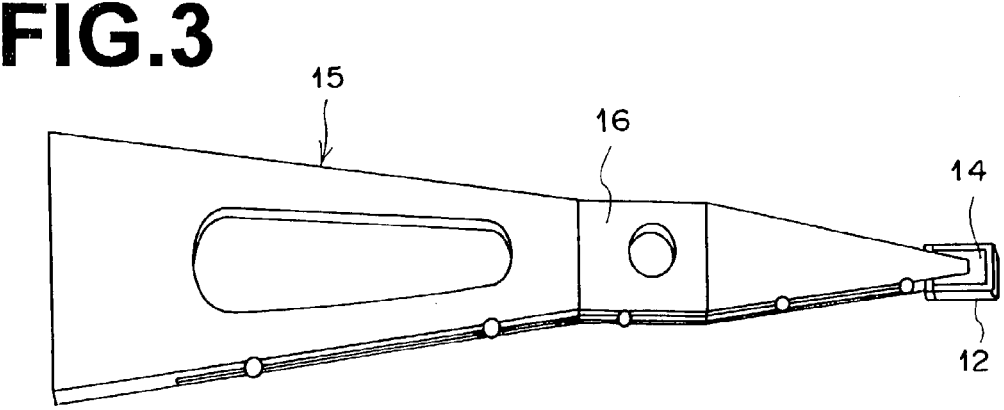
FIG. 3 is a plan view showing the magnetic head of FIG. 1 mounted on an arm.

More specifically, the head slider 12 is held by the gimbal 14 which is mounted at the tip of a suspension member 16 of a magnetic head arm 15 so that the magnetic head element 13 is positioned at the opposite end of the head slider 12 from the magnetic head arm 15, as shown in FIG. 3. The head slider 12 is movable between a recording/reproducing position wherein it faces the magnetic disk medium 20 as shown in FIG. 2, and a standby position wherein it retreats to a position outside the circumference of the magnetic disk media 20, by movement of the magnetic head arm 15. In addition, the head slider 12 is moved in the radial direction of the magnetic disk medium 20 to be placed in positions wherein it faces specific tracks by movement of the magnetic head arm 15 in the aforementioned recording/reproducing position.

Figure 4:
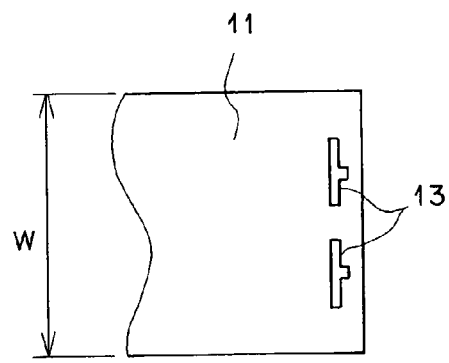
FIG. 4 is a magnified plan view of a portion of the magnetic head of FIG. 1.

The two head elements 13 are provided on one rail 11, separated in the width direction thereof. Note that the arrangement of the head elements 13 on the rail 11 is shown in the magnified view of FIG. 4. Here, the width W of the rail 11 is, for example, approximately 300 µm.

Only the two head elements 13 provided on one of the rails 11 are actually utilized for recording/reproduction, and the two head elements 13 provided on the other rail 11 are not utilized. That is, the head slider 12 is of this construction because that which is placed on the upper side of the magnetic disk medium 20 as shown in FIG. 2, and that which is placed on the lower side of the magnetic disk medium 20 (not shown) are manufactured in a common step. With regard to the head slider 12 to be placed on the lower side of the magnetic disk medium 20, the two head elements 13 provided on the aforementioned other rail 11 are utilized.

The width direction of the rail 11 is substantially perpendicular to the direction of relative movement between the magnetic head 10 and the magnetic disk medium 20 (refer to FIG. 2), and a plurality of tracks are arranged in this width direction on the magnetic disk medium 20. Accordingly, simultaneous recording or reproduction is enabled to be performed at two locations of the magnetic disk medium 20 by employing the two head elements 13. Therefore, it becomes possible to increase the data transfer rate during recording/reproduction.

In addition, servo signals for tracking control can be read out from two locations of the magnetic disk medium 20 by employing the two head elements 13. Therefore, even if servo signals are missing from one location of the magnetic disk medium 20 due to signal dropout or the like, servo signals from the other location become usable, thereby the accuracy of tracking control can be improved.

In addition, a combined head element comprising an inductive one and an MR one formed by a thin film process is used as the head element 13 in the present embodiment. Therefore, the two head elements 13 are enabled to be formed while accurately maintaining the distance therebetween.

Figure 5:
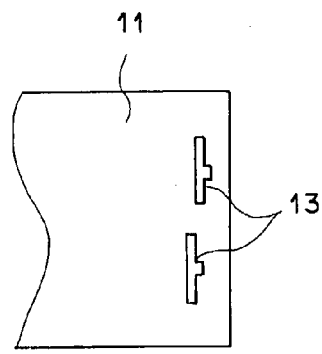
FIG. 5 is a plan view showing a modified version of the magnetic head of FIG. 1.

Note that, as shown in FIG. 5, the two head elements 13 may alternatively be formed at intervals in the direction of relative movement between the magnetic head 10 and the magnetic disk medium 20 (the length direction of the rail 11).

Figure 6:
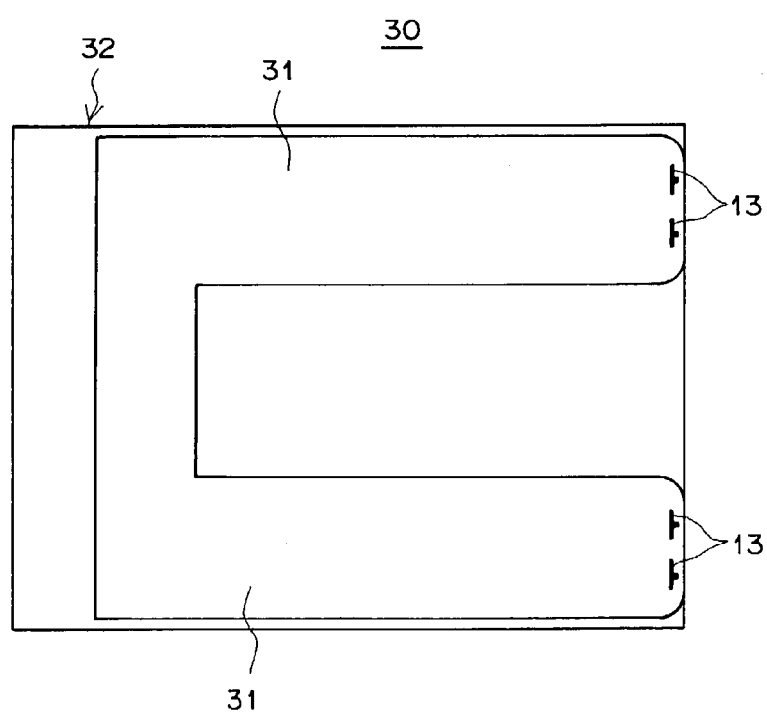
FIG. 6 is a plan view showing a magnetic head according to a second embodiment of the present invention.

The present invention is not limited to application to magnetic heads having a plurality of completely separated rails, as illustrated in the embodiment described above, but may also be applied to magnetic heads having rails which are linked at the front ends thereof. FIG. 6 shows a magnetic head 30 formed in this manner, as a second embodiment of the present invention. Note that with regard to FIG. 6, the same elements as those shown in FIGS. 1 through 5 are denoted with the same reference numerals, and further description of these elements are omitted insofar as it is not particularly necessary.

Two rails 31, 31 are formed on a head slider 32 in the magnetic head 30 shown in FIG. 6. The rails 31, 31 are linked to each other at the front ends thereof. Two head elements 13 are formed on each rail 31, separated in the width direction thereof. The same effects as obtained in the first embodiment are exhibited by the present embodiment.

Figure 7:
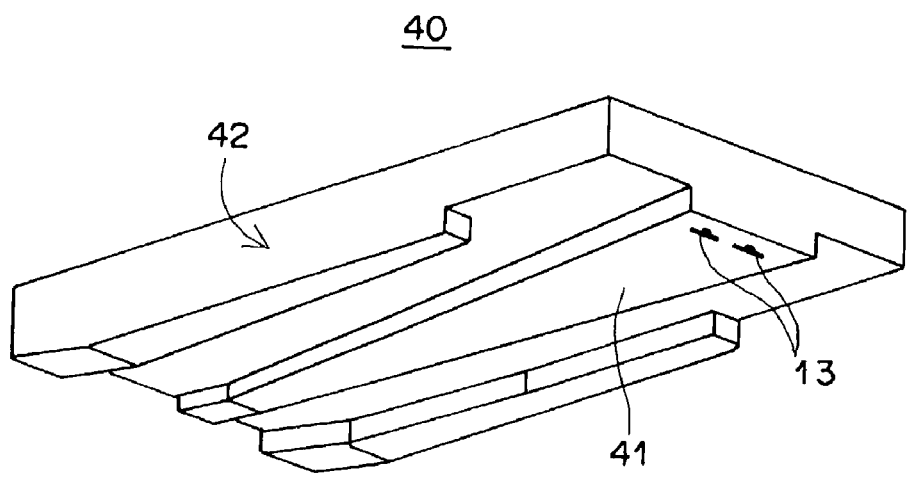
FIG. 7 is a perspective view showing a magnetic head according to a third embodiment of the present invention.

Next, a third embodiment of the present invention will be described with reference to FIG. 7. A magnetic head 40 according to the third embodiment has three rails 41 formed on a head slider 42. Head elements 13 are formed only on one of the rails 41. Here also, two head elements 13 are formed on the rail 41 separated in the width direction thereof, and the same effects as obtained in the first embodiment are exhibited by the present embodiment.

Figure 8:
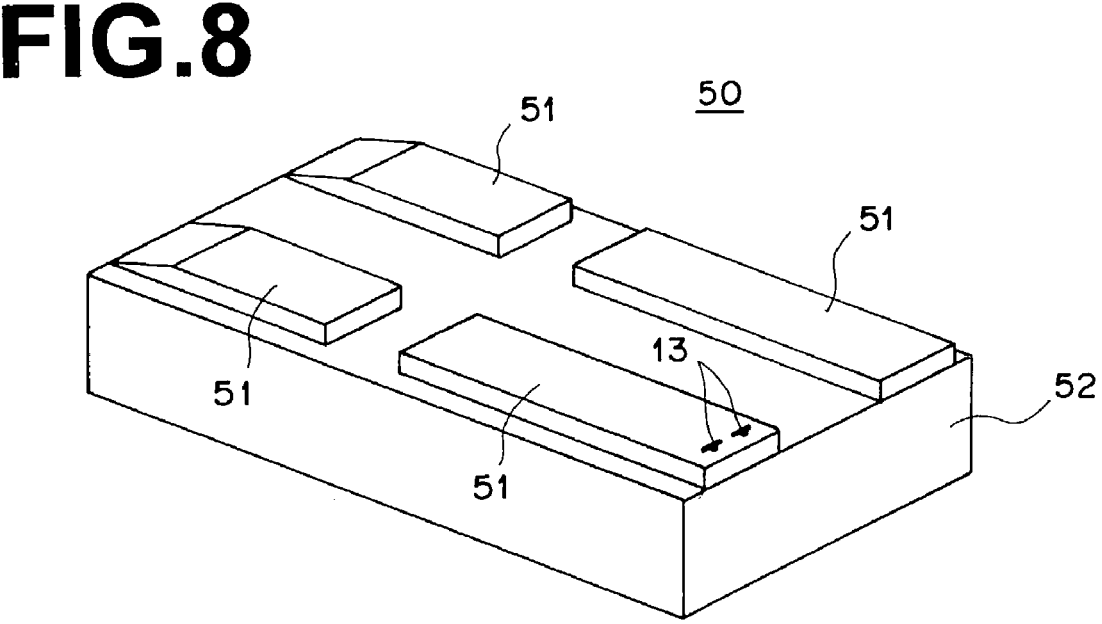
FIG. 8 is a perspective view showing a magnetic head according to a fourth embodiment of the present invention.

Next, a fourth embodiment of the present invention will be described with reference to FIG. 8. A magnetic head 50 according to the fourth embodiment has four floating pads 51 formed on a head slider 52. Two head elements 13 are formed on one of the floating pads 51 separated in the width direction (the direction substantially perpendicular to the direction of relative movement between the magnetic head 50 and a magnetic disk medium not shown in the figure) thereof. The same effects as obtained in the first embodiment are exhibited by the present embodiment.

Note that with regard to the present invention, the number of rails or pads formed on a head slider is not limited to those given in the embodiments described above, and other numbers can be suitably applied. In addition, the number of head elements formed on one of the rails or pads is not limited to two, as given in the embodiments described above. Three or more head elements may be formed on the rails or pads.

What is claimed is:

1. A magnetic head for magnetically recording and/or reproducing data from magnetic disk media, comprising:
 a head slider for approaching or contacting said magnetic disk media;
 rails or pads formed on said head slider; and
 head elements provided on said rails or said pads; wherein
 a plurality of said head elements are provided on one of said rails or said pads at intervals along a track arrangement direction of said magnetic disk media, said plurality of head elements being operative to simultaneously record and/or reproduce data from multiple locations of said magnetic disk media;
 wherein said magnetic head further comprises a head arm including a suspension member and a gimbal mounted at a tip of said suspension member, said gimbal holding said magnetic head slider;

wherein said rails or pads are tapered so that the thicknesses thereof decrease toward one of the ends thereof;

said head elements are provided in the vicinity of the end of said rails or said pads opposite said tapered ends thereof; and said head slider is held by said gimbal so that said magnetic head element is positioned at the opposite end thereof from said head arm;

wherein said head slider is provided with two rails; and each of said rails is provided with said magnetic head elements.

2. A magnetic head for magnetically recording and/or reproducing data from magnetic disk media, comprising:

a head slider for approaching or contacting said magnetic disk media;

rails or pads formed on said head slider; and head elements provided on said rails or said pads; wherein a plurality of said head elements are provided on one of said rails or said pads at intervals along a track arrangement direction of said magnetic disk media, said plurality of head elements being operative to simultaneously record and/or reproduce data from multiple locations of said magnetic disk media;

wherein said magnetic head further comprises a head arm including a suspension member and a gimbal mounted at a tip of said suspension member, said gimbal holding said magnetic head slider;

wherein said rails or pads are tapered so that the thicknesses thereof decrease toward one of the ends thereof;

said head elements are provided in the vicinity of the end of said rails or said pads opposite said tapered ends thereof; and said head slider is held by said gimbal so that said magnetic head element is positioned at the opposite end thereof from said head arm;

wherein said head slider is provided with three rails; and the central rail among said three rails is provided with said magnetic head elements.

3. A drive apparatus comprising:

a drive means for rotating magnetic disk media;

a magnetic head for recording and/or reproducing signals to and/or from said magnetic disk media; and a head moving means for moving said magnetic head in the radial direction of said magnetic disk media; wherein said magnetic head comprises:

a head arm including a suspension member;

a gimbal mounted at a tip of said suspension member;

a magnetic head slider held by said gimbal;

rails or pads formed on said head slider; and a plurality of head elements provided on at least one of said rails or pads with intervals therebetween along a track arrangement direction of said magnetic disk media, said plurality of head elements being operative to simultaneously record and/or reproduce data from multiple locations of said magnetic disk media;

wherein said rails or pads are tapered so that the thicknesses thereof decrease toward one of the ends thereof;

said head elements are provided in the vicinity of the end of said rails or said pads opposite said tapered ends thereof; and said head slider is held by said gimbal so that said magnetic head element is positioned at the opposite end thereof from said head arm wherein said head slider is provided with two rails; and each of said rails is provided with said magnetic head elements.

4. A drive apparatus comprising:

a drive means for rotating magnetic disk media;

a magnetic head for recording and/or reproducing signals to and/or from said magnetic disk media; and a head moving means for moving said magnetic head in the radial direction of said magnetic disk media; wherein said magnetic head comprises:

a head arm including a suspension member:

a gimbal mounted at a tip of said suspension member;

a magnetic head slider held by said gimbal;

rails or pads formed on said head slider; and a plurality of head elements provided on at least one of said rails or pads with intervals therebetween along a track arrangement direction of said magnetic disk media, said plurality of head elements being operative to simultaneously record and/or reproduce data from multiple locations of said magnetic disk media;

wherein said rails or pads are tapered so that the thicknesses thereof decrease toward one of the ends thereof;

said head elements are provided in the vicinity of the end of said rails or said pads opposite said tapered ends thereof; and said head slider is held by said gimbal so that said magnetic head element is positioned at the opposite end thereof from said head arm;

wherein said head slider is provided with three rails; and the central rail among said three rails is provided with said magnetic head elements.

* * * * *